US012553275B2

(12) United States Patent
Dunn

(10) Patent No.: US 12,553,275 B2
(45) Date of Patent: Feb. 17, 2026

(54) RECYCLABLE SAFE

(71) Applicant: NCR Atleos Corporation, Atlanta, GA (US)

(72) Inventor: Bruce Dunn, Dundee (GB)

(73) Assignee: NCR Atleos Corporation, Atlanta, GA (US)

( * ) Notice: Subject to any disclaimer, the term of this patent is extended or adjusted under 35 U.S.C. 154(b) by 210 days.

(21) Appl. No.: 17/877,031

(22) Filed: Jul. 29, 2022

(65) Prior Publication Data

US 2024/0035330 A1 Feb. 1, 2024

(51) Int. Cl.
*E05G 1/024* (2006.01)

(52) U.S. Cl.
CPC .................................... *E05G 1/024* (2013.01)

(58) Field of Classification Search
CPC .............. E05G 1/00; E05G 1/02; E05G 1/024
See application file for complete search history.

(56) References Cited

U.S. PATENT DOCUMENTS

| | | | | |
|---|---|---|---|---|
| 3,916,804 | A * | 11/1975 | Noone | E05G 1/024 109/78 |
| 4,048,926 | A * | 9/1977 | Brush, Jr. | E05G 1/024 109/83 |
| 4,158,338 | A * | 6/1979 | Dippold | E05G 1/024 109/83 |
| 4,389,948 | A * | 6/1983 | Sands | E05G 1/024 109/82 |
| 4,593,627 | A * | 6/1986 | Lankard | E05G 1/024 106/644 |
| 7,926,407 | B1 * | 4/2011 | Hallissy | F42D 5/05 109/83 |
| 8,555,794 | B2 * | 10/2013 | Tamura | G07F 9/0235 109/78 |
| 2009/0045203 | A1 * | 2/2009 | Ehrlich | E05G 1/02 312/409 |
| 2013/0233211 | A1 * | 9/2013 | Tavares de Pinho | E05G 1/024 109/51 |

FOREIGN PATENT DOCUMENTS

| | | |
|---|---|---|
| DE | 1956238 | 5/1971 |
| DE | 3241526 | 12/1983 |
| EP | 0899406 | 3/1999 |
| GB | 2101173 | 1/1983 |

* cited by examiner

*Primary Examiner* — Christopher J Boswell
(74) *Attorney, Agent, or Firm* — Schwegman Lundberg & Woessner, P.A.

(57) ABSTRACT

One embodiment is a safe including an outer wall formed of a metal, an inner wall formed of the metal, and a coarse aggregate and fill material filling a gap between the outer and inner walls. The fill material, such as a metal or thermoplastic with a melting point lower than the metal of the inner and outer walls.

18 Claims, 3 Drawing Sheets

RECYCLABLE SAFE

BACKGROUND INFORMATION

Many modern safes are constructed in layers so that a next layer cannot be defeated in the same manner as previous layer. For example, safes used in many kiosk devices, such as automated teller machines (ATMs) and self-checkout terminals, have inner and outer steel layers with hardened concrete between them. In such safes, tools used to defeat the steel layers are less effective in defeating the concrete layer. However, such safes, from a practical perspective, are non-recyclable as separating the layers is difficult, time consuming, and expensive.

SUMMARY

Various embodiments herein relate to safes, and in particular, safes that are constructs to maintain security standards while also being capable of disassembly for recycling most if not all materials.

One safe embodiment includes an inner cuboid nested within an outer cuboid. The inner cuboid has at least one face parallel to a face of the outer cuboid. The inner cuboid and outer cuboid formed of a metal, such as mild steel or even stronger steel such as chromoly or tungsten steel alloys. This embodiment further includes an intermediate space between an inner surface of the outer cuboid and an outer surface of the inner cuboid. The intermediate space in such embodiments is filled with a coarse aggregate and a fill material. The fill material fills a remainder of the intermediate space including gaps between the coarse aggregate. The fill material, such as aluminum, tin, or other metal or thermoplastic, has a solid phase at ambient indoor and outdoor temperatures and a melting point lower than the metal forming the inner and outer cuboids. The safe further includes a door on parallel faces of the inner and outer cuboids providing access to an inner cavity of the inner cuboid through the inner and outer cuboids and the filled intermediate space.

Another safe embodiment includes a safe with an outer wall formed of a metal, an inner wall formed of the metal, and a coarse aggregate and fill material filling a gap between the outer and inner walls. The fill material of these embodiments has a solid phase at ambient indoor and outdoor temperatures and a liquid phase at a temperature lower than a melting temperature of the metal forming the inner and outer walls.

A further embodiment in the form of a method includes forming an inner cuboid of a safe from sheet steel having a thickness of at least 2 mm and forming an outer cuboid of a safe from sheet steel having a thickness of at least 2 mm. The method continues by nesting the inner cuboid within the outer cuboid oriented with the inner cuboid having at least one face parallel to a face of the outer cuboid and leaving an intermediate space between an inner surface of the outer cuboid and an outer surface of the inner cuboid. The method may then fill the intermediate space with a coarse aggregate and a fill material that fills a remainder of the intermediate space including gaps between the coarse aggregate. The fill material of such embodiments has a solid phase at ambient indoor and outdoor temperatures and having a melting point lower than the steel forming the inner and outer cuboids. The method also includes providing a door on parallel faces of the inner and outer cuboids providing access an inner cavity of the inner cuboid through the inner and outer cuboids and the filled intermediate space.

DETAILED DESCRIPTION

Various embodiments herein relate to safes, and in particular, safes that are constructed to maintain security standards while also being capable of disassembly for recycling most if not all materials. Such embodiments provide environmentally conscious safes for use in many ways, but as ATMs and self-service checkouts and other currency related kiosk terminals become ubiquitous, the contributions herein go a long way toward minimizing landfill and environmental impact.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

Figure 1:
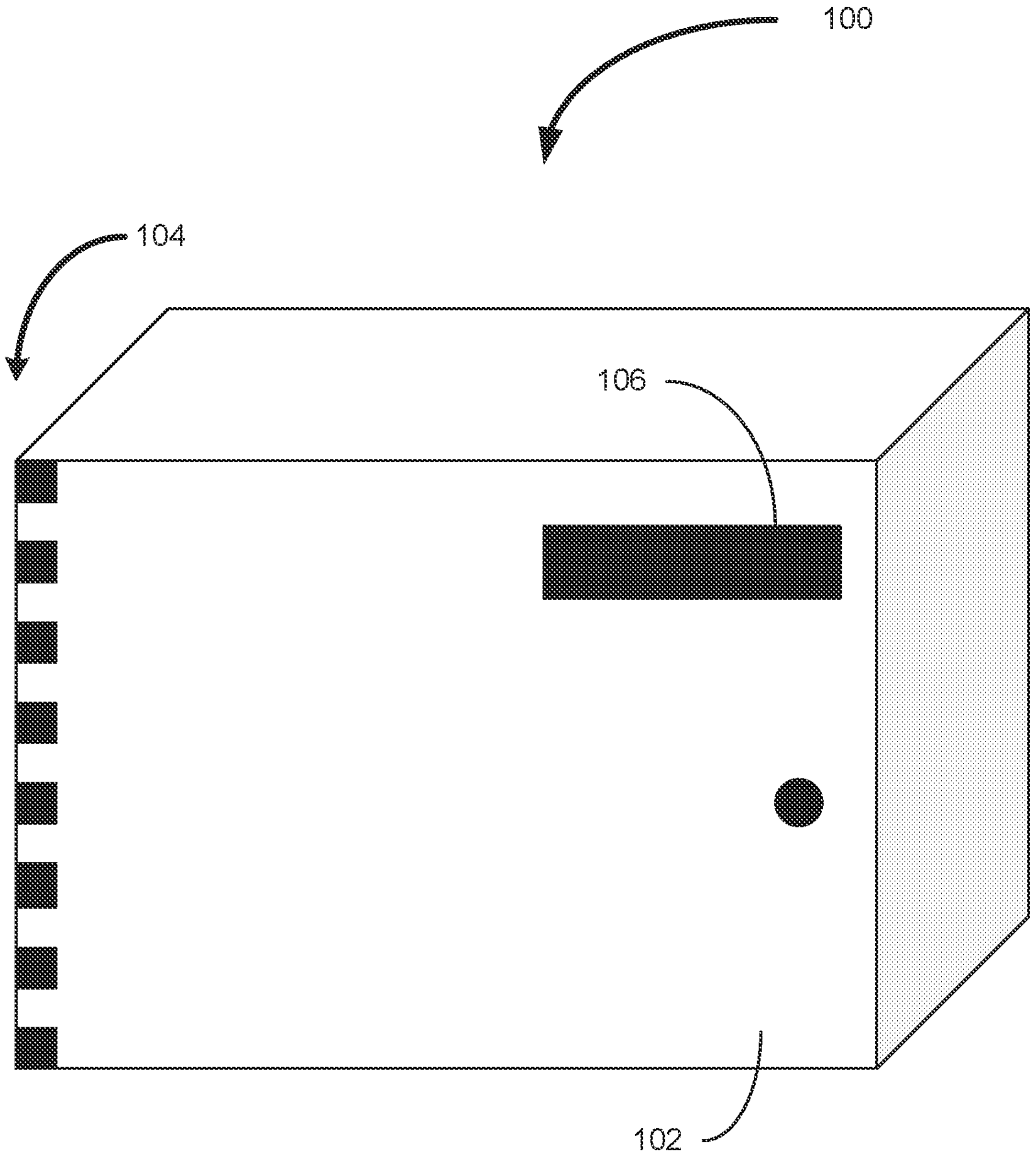
FIG. 1 is an illustration of a safe, according to an example embodiment.

FIG. 1 is an illustration of a safe 100, according to an example embodiment. The safe 100 is generally cuboid in shape, although variation from that shape or rounding of corners is present in various embodiments. The safe 100 may have various dimensions sized according to the needs of a particular deployment. For example, dimensions of the safe 100 may be determined based different factors such as what is to be held in an internal cavity of the safe 100, where the safe 100 is to be deployed or within what the safe is to be installed, a level of security or fireproof requirements that impact safe 100 wall thickness, and other possible factors.

The safe 100, as illustrated includes a hinged 104 door 102 that may be secured by one or more locks. The safe 100, in some embodiments such as in currency related kiosk embodiments, e.g., ATMs, self-service checkouts, includes one or more openings 106 through which currency or other documents may pass to and from an internal cavity of the safe 100. In such embodiments, the internal cavity may be sized to hold one or more currency cartridges and other currency and document handling devices as needed in a particular embodiment.

Figure 2:
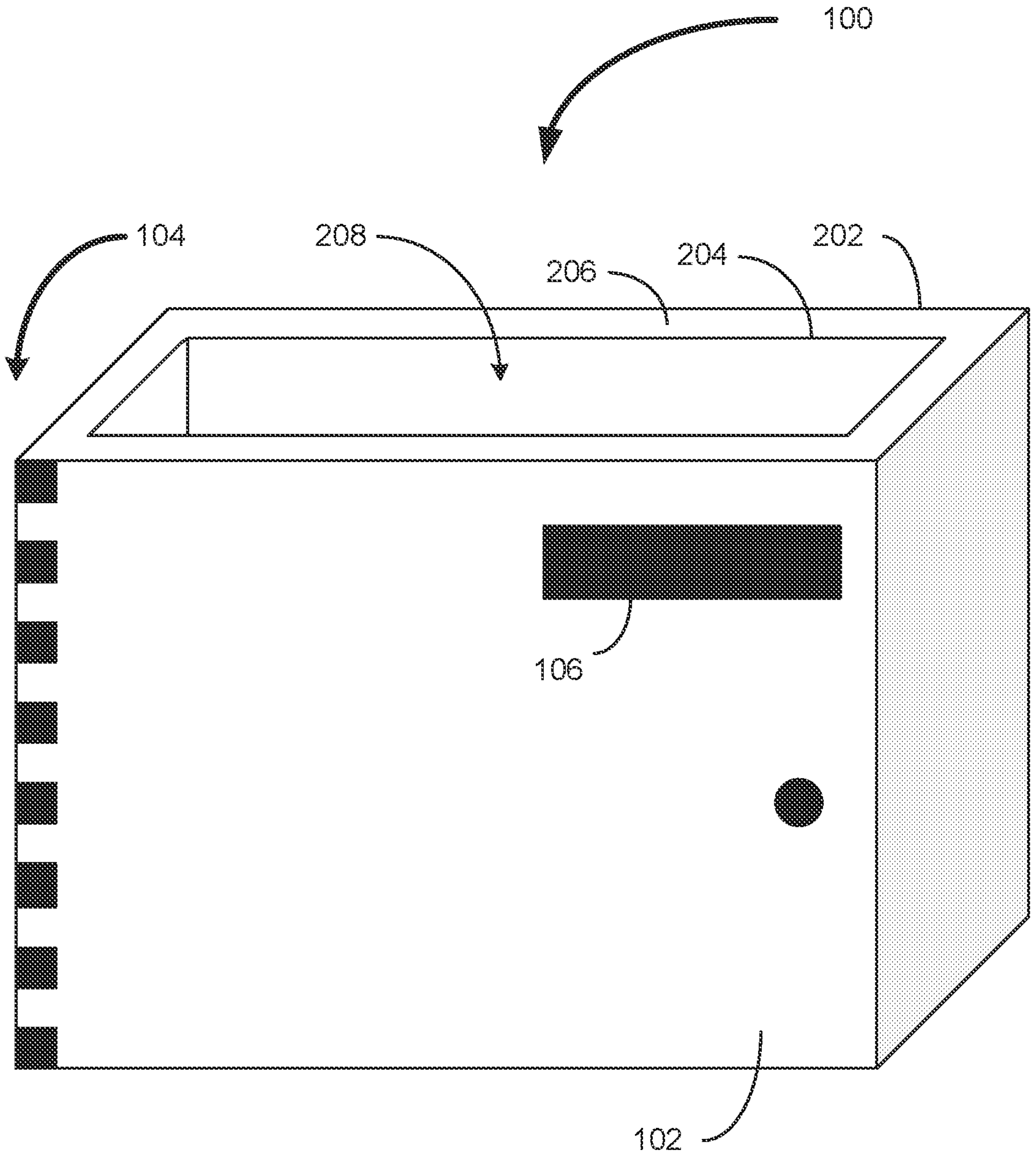
FIG. 2 is a sectional illustration of a safe according to an example embodiment.

FIG. 2 is a sectional illustration of the safe 100 according to an example embodiment. The safe 100 as illustrated in FIG. 2 has one side removed revealing the internal cavity 208 of the safe 100, the outer and inner walls 202, 204, and the intermediate space 206.

The safe 100 in such embodiments includes the outer wall 202 formed of a metal, the inner 204 wall formed of the metal, and an intermediate space 206 between the outer and inner walls 202, 204. The intermediate space 206 is filled with a coarse aggregate and fill material. The fill material has a solid phase at ambient indoor and outdoor temperatures and a liquid phase at a temperature lower than a melting temperature of the metal forming the inner and outer walls.

For example, the fill material may be aluminum or a thermoplastic such as polycarbonate when the outer and inner walls 202, 204 are made of steel. The lower melting point of the fill material allow for the intermediate space to be filled with the course aggregate and then solidified by pour molten fill material into the intermediate space and allowing it to cool. Conversely, when the safe 100 is to be recycled, the intermediate space 206 of the safe 100 may be exposed through disassembly and then heated until the fill material reaches its liquid phase. The molten fill material may then be poured out or drained, the coarse aggregate separated out, and the outer and inner walls 202, 204 separated. These materials may then be recycled, repurposed, or reused, with little material having to be sent to a landfill.

The safe 100 may be constructed in two or more sections. For example, each wall may be constructed individually. In other embodiments, the portion of the safe 100 illustrated in FIG. 2 may be constructed as one piece and a door or lid may be constructed separately.

In some embodiments, a thickness of the walls of the safe, measured from an outer surface of the outer wall 202 to an inner surface of the inner wall 204 facing the internal cavity 208 is approximately 40 mm. However, the thickness may vary between embodiments and walls of the safe 100 may have differing thicknesses in various embodiments. For example, vertically oriented walls may have one thickness and horizontally oriented walls may have a different thickness.

Figure 3:
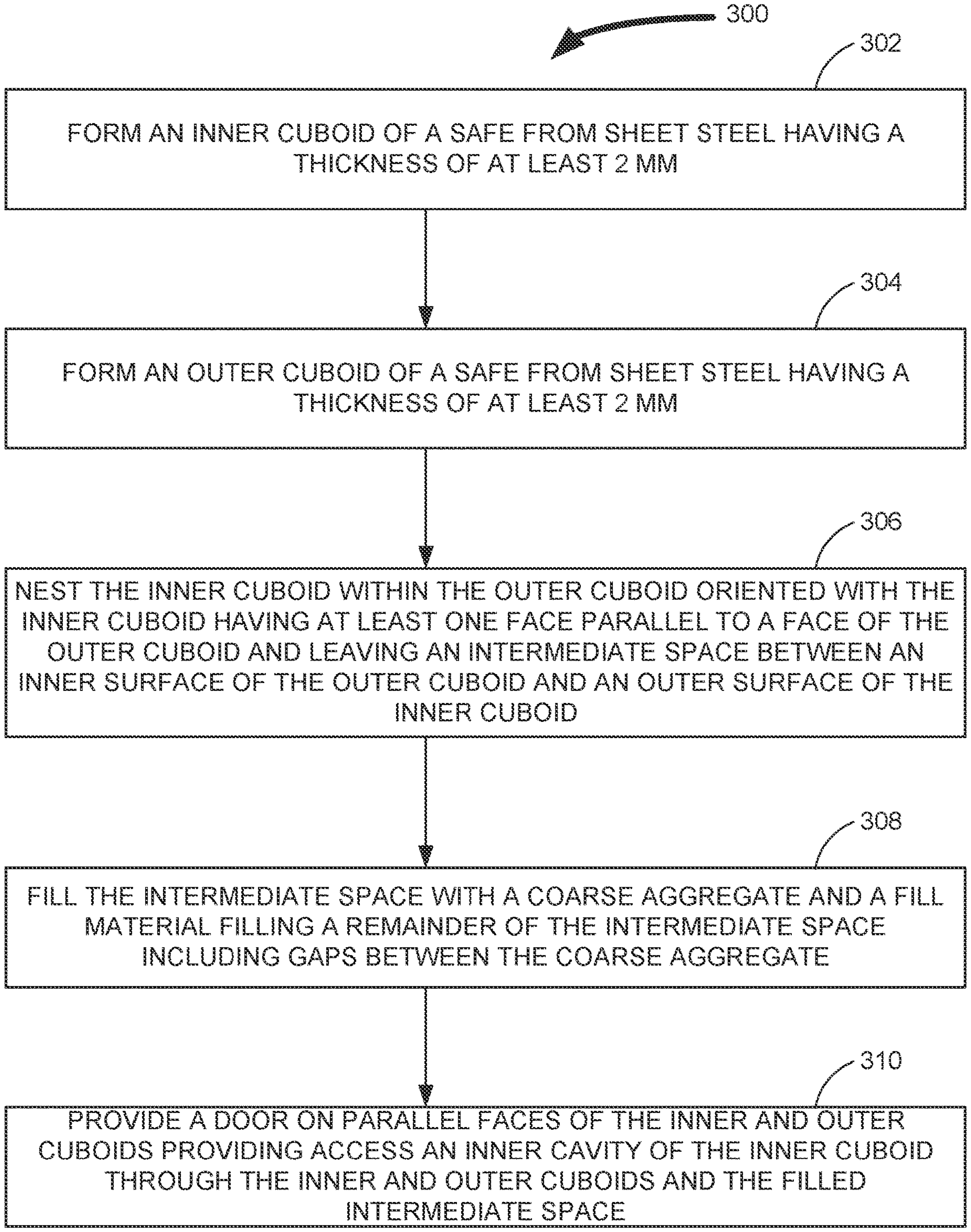
FIG. 3 is a block flow diagram of a method according to an example embodiment.

FIG. 3 is a block flow diagram 300 of a method according to an example embodiment. The method 300 is a method that may be performed to construct a safe according to some embodiments.

The method 300 includes forming 302 an inner cuboid of a safe from sheet steel having a thickness of at least 2 mm and forming 304 an outer cuboid of a safe from sheet steel having a thickness of at least 2 mm. The method 300 also includes nesting 306 the inner cuboid within the outer cuboid oriented with the inner cuboid having at least one face parallel to a face of the outer cuboid and leaving an intermediate space between an inner surface of the outer cuboid and an outer surface of the inner cuboid.

The method 300 may continue with filling 308 the intermediate space with a coarse aggregate and a fill material filling a remainder of the intermediate space including gaps between the coarse aggregate. The fill material in some embodiments has a solid phase at ambient indoor and outdoor temperatures and having a melting point lower than the steel forming the inner and outer cuboids. The method 300 additionally includes providing 310 a door on parallel faces of the inner and outer cuboids providing access an inner cavity of the inner cuboid through the inner and outer cuboids and the filled intermediate space.

A safe an additionally embodiment includes an inner cuboid nested within an outer cuboid. The inner cuboid has at least one face parallel to a face of the outer cuboid. The inner cuboid and outer cuboid formed of a metal, such as mild steel or even stronger steel such as chromoly or tungsten steel alloys. This embodiment further includes an intermediate space between an inner surface of the outer cuboid and an outer surface of the inner cuboid. The intermediate space in such embodiments is filled with a coarse aggregate and a fill material. The fill material fills a remainder of the intermediate space including gaps between the coarse aggregate. The fill material, such as aluminum, tin, or other metal or thermoplastic, has a solid phase at ambient indoor and outdoor temperatures and a melting point lower than the metal forming the inner and outer cuboids. The safe further includes a door on parallel faces of the inner and outer cuboids providing access to an inner cavity of the inner cuboid through the inner and outer cuboids and the filled intermediate space.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A safe comprising:

an inner cuboid nested within an outer cuboid;

the inner cuboid having at least one face parallel to a face of the outer cuboid;

the inner cuboid and outer cuboid formed of a metal;

an intermediate space between an inner surface of the outer cuboid and an outer surface of the inner cuboid, the intermediate space filled with a coarse aggregate and a fill material filling a remainder of the intermediate space including gaps between the coarse aggregate, the fill material with a solid phase at ambient indoor and outdoor temperatures and having a melting point lower than the metal forming the inner cuboid and the outer cuboid; and a door on parallel faces of the inner cuboid and the outer cuboid providing access to an inner cavity of the inner cuboid through the inner cuboid and the outer cuboid and a filled intermediate space;

wherein the inner cuboid and the outer cuboid, with the filled intermediate space filled with the coarse aggregate and the fill material are formed as two or more distinct sides of the safe and are assembled to complete a cuboid structure of the safe including the inner cuboid and the outer cuboid;

the safe further comprising one or more openings through which currency or other documents may pass to and from the inner cavity, wherein the inner cavity is sized to hold one or more currency cartridges and other currency and document handling devices;

wherein the metal is mild steel or chromoly or tungsten steel alloy;

wherein the fill material and coarse aggregate are removable from the intermediate space by heating the fill material to at least the melting point but lower than a melting point of the metal, providing environmentally conscious safes with materials that are recyclable.

2. The safe of claim 1, wherein the fill material is aluminum.

3. The safe of claim 1, wherein the fill material is at least one of a thermoplastic polymer and a thermoplastic rubber.

4. The safe of claim 1, wherein the fill material and coarse aggregate are removable from the intermediate space by heating he fill material to at least the melting point but lower than a melting point of the metal.

5. The safe of claim 1, further comprising:

passages formed in the safe, the passages sized to allow documents to pass into and out of the inner cavity.

6. The safe of claim 1, wherein the inner cavity is sized to hold a currency cartridge of a currency dispensing kiosk.

7. A safe comprising:

an outer wall formed of a metal;

an inner wall formed of the metal; and a coarse aggregate and fill material filling a gap between the outer wall and the inner wall, the coarse aggregate and fill material with a solid phase at ambient indoor and outdoor temperatures and a liquid phase at a temperature lower than a melting temperature of the metal forming the inner wall and the outer wall;

wherein sides of the safe include at least two elements that are couplable to form the safe;

wherein the safe includes one or more openings through which currency or other documents may pass to and from an internal cavity, wherein the internal cavity is sized to hold one or more currency cartridges and other currency and document handling devices;

wherein the metal is mild steel or chromoly or tungsten steel alloy;

wherein the coarse aggregate and fill material are removable from the gap between the outer wall and the inner wall by heating the coarse aggregate and fill material to a melting temperature of the coarse aggregate and fill material but lower than a melting point of the metal forming the outer wall and the inner wall, providing environmentally conscious safes with materials that are recyclable.

8. The safe of claim 7, wherein the coarse aggregate and fill material is aluminum.

9. The safe of claim 7, wherein the coarse aggregate and fill material is a thermoplastic polymer.

10. The safe of claim 7, wherein the coarse aggregate and fill material and coarse aggregate are removable from the gap between the outer wall and the inner wall by heating the coarse aggregate and fill material to a melting temperature of the coarse aggregate and fill material but lower than a melting point of the metal forming the outer wall and the inner wall.

11. The safe of claim 7, wherein a thickness dimension from an outer surface of the outer wall to an inner surface of the inner wall facing an internal cavity of the safe is approximately 40 mm.

12. The safe of claim 7, wherein an inner cavity of the safe is sized to hold currency-related equipment of a kiosk.

13. The safe of claim 12, further comprising:

passages formed in the safe, the passages sized to allow documents to pass into and out of currency related equipment installed within the inner cavity.

14. The safe of claim 7, wherein the metal is a steel alloy.

15. A method comprising:

forming an inner cuboid of a safe from sheet steel having a thickness of at least 2 mm;

forming an outer cuboid of a safe from sheet steel having a thickness of at least 2 mm;

nesting the inner cuboid within the outer cuboid oriented with the inner cuboid having at least one face parallel to a face of the outer cuboid and leaving an intermediate space between an inner surface of the outer cuboid and an outer surface of the inner cuboid;

filling the intermediate space with a coarse aggregate and a fill material filling a remainder of the intermediate space including gaps between the coarse aggregate, the coarse aggregate and the fill material with a solid phase at ambient indoor and outdoor temperatures and having a melting point lower than the sheet steel forming the inner cuboid and the outer cuboid; and providing a door on parallel faces of the inner cuboid and the outer cuboid providing access an inner cavity of the inner cuboid through the inner cuboid and the outer cuboid and a filled intermediate space; and wherein the inner cuboid and the outer cuboid, with the filled intermediate space filled with the coarse aggregate and the fill material are formed as two or more distinct sides of the safe and are assembled to complete a cuboid structure of the safe including the inner cuboid and the outer cuboid;

wherein the inner cavity is sized to hold one or more currency cartridges and other currency and document handling devices and includes one or more openings through which currency or other documents may pass to and from the inner cavity;

wherein a metal of the sheet steel is mild steel or chromoly or tungsten steel alloy;

wherein the fill material and coarse aggregate are removable from the intermediate space by heating the fill material to at least the melting point but lower than a melting point of the metal, providing environmentally conscious safes that are constructed to maintain security standards while also being capable of disassembly for recycling of materials.

16. The method of claim 15, wherein the fill material is aluminum.

17. The method of claim 15, wherein the fill material is a thermoplastic polymer.

18. The method of claim 15, wherein the fill material and coarse aggregate are removable from the intermediate space by heating the fill material to at least the melting point but lower than a melting point of the metal.

* * * * *